U. G. LEE.
ENGRAVING MACHINE.
APPLICATION FILED MAY 19, 1910.

1,006,238.

Patented Oct. 17, 1911.
5 SHEETS—SHEET 1.

Attest:
Ewd L. Tolson
Bent. M. Stahl.

Inventor:
Ulysses G. Lee
by Spear, Middleton,
Donaldson & Spear
Attys.

U. G. LEE.
ENGRAVING MACHINE.
APPLICATION FILED MAY 19, 1910.

1,006,238.

Patented Oct. 17, 1911.
5 SHEETS—SHEET 2.

Attest:
Ewd L. Tolson.
Bert M. Stahl.

Inventor:
Ulysses G. Lee
by Spear, Middleton, Donaldson & Spear
Attys.

U. G. LEE.
ENGRAVING MACHINE.
APPLICATION FILED MAY 19, 1910.

1,006,238.

Patented Oct. 17, 1911.
5 SHEETS—SHEET 3.

U. G. LEE.
ENGRAVING MACHINE.
APPLICATION FILED MAY 19, 1910.

1,006,238.

Patented Oct. 17, 1911.

Attest:
Ed L. Tolson
Bent. M. Stahl

Inventor:
Ulysses G. Lee
by Spear, Middleton, Donaldson & Spear
Attys.

UNITED STATES PATENT OFFICE.

ULYSSES G. LEE, OF NEW YORK, N. Y., ASSIGNOR TO MONTAGUE MAILING MACHINERY CO., OF NEW YORK, N. Y., A CORPORATION OF TENNESSEE.

ENGRAVING-MACHINE.

1,006,238.  Specification of Letters Patent.  Patented Oct. 17, 1911.

Application filed May 19, 1910. Serial No. 562,320.

*To all whom it may concern:*

Be it known that I, ULYSSES G. LEE, citizen of the United States, residing at New York, N. Y., have invented certain new and useful Improvements in Engraving-Machines, of which the following is a specification.

The invention includes an improved pantograph mechanism, and automatic grinding mechanism, with means for throwing the grinding mechanism into action when the cutting is stopped, and it includes other features and combination and arrangement of parts hereinafter described and particularly pointed out in the claims.

In the accompanying drawings: Fig. 4ª is a plan view of the stylus arm; Fig. 6ª is a side view of the stylus arm; Fig. 23ª is a side view of the die support; Fig. 29ª is another view of this bearing bracket.

In these drawings, 1 is the bed of the machine having a carriage or slide 2 mounted therein to have reciprocating movement, said carriage or slide having mounted thereon the turret or holder 3 for the die stock or work piece to be cut or engraved. The cutter 4 is mounted in a spindle 5, and said spindle, in turn, is mounted in two ball bearings 6 and 7. The upper ball bearing is supported by a socket 8 which is mounted on or formed with the frame bracket 9 extending up from the bed 1, and supported thereon. The spindle 5 is adapted to have vertical movement through the ball 7, and it may assume different angular positions by the turning of the said ball 7 in the bearing or cup 8. The spindle is driven through a friction wheel 10 mounted thereon of cup form, and embracing the cup or bearing 8 of the ball 7. This friction wheel is engaged by a friction drive wheel 11 pinned to a shaft 12 which is mounted in a sleeve 13, the said sleeve being, in turn, mounted in bearings 14 of a bracket 15, which is supported on the bed 1. Motion is communicated to the friction drive wheel 11 from any suitable source of power, such as an electric motor 16 mounted on the bed plate, the motion being transmitted through a belt indicated at 17 engaging the grooved portion 19 of the drive pulley 11. The cup shaped drive wheel 10 is provided with a spherically shaped edge 20 engaged by the friction surface 21 on the drive wheel 11. On the lower end of the spindle 5 there is an enlarged collar portion 22 which bears against a flattened portion of the ball 6 on its under side, thereby taking the thrust, while a sleeve 23 held in position by jam nuts 24 serves to hold the spindle from longitudinal movement through the lower ball 6. The lower spindle bearing is slightly tapered within the ball 6, while it is perfectly cylindrical in its upper bearing in the ball 7. This will allow the spindle to revolve freely within the ball 7, and also to have free up and down motion therethrough. The upper ball 7 is held in its bearing by a socket nut 25.

Figures 3, 4, 4A, 5, 6, 6A, 28, 29, 29A:
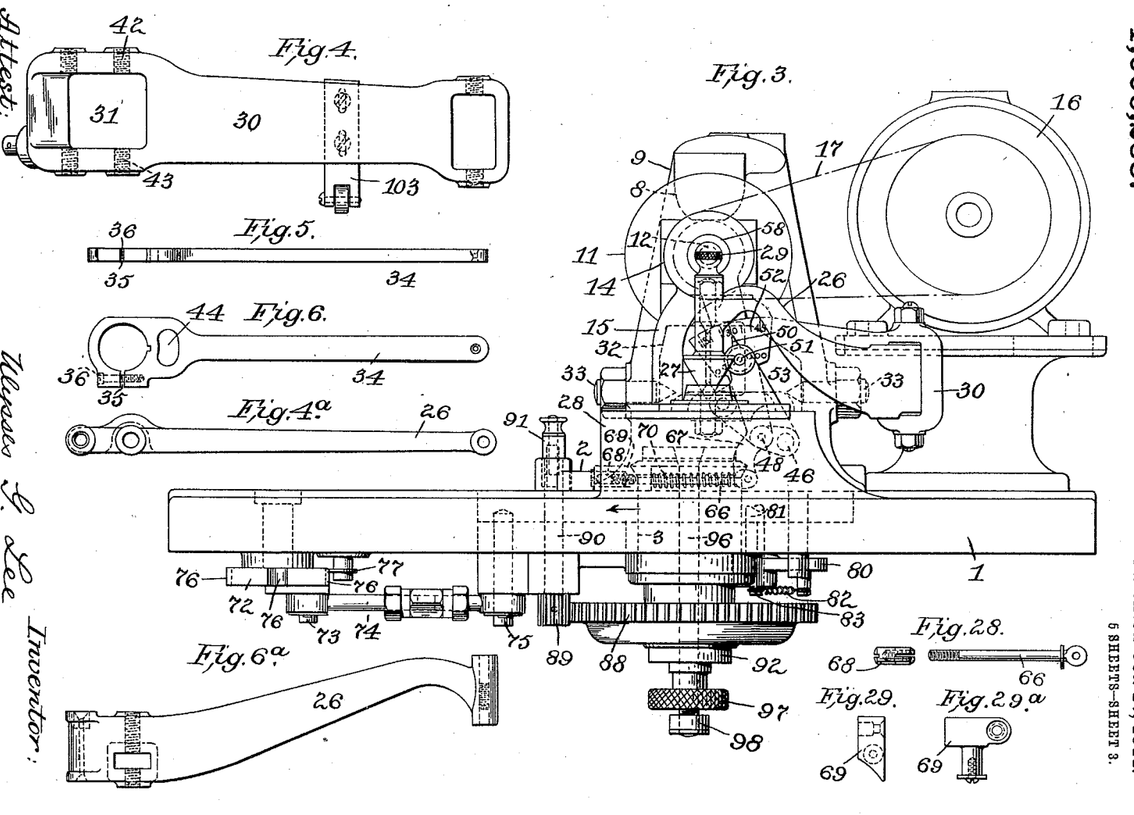
Fig. 3 is a side elevation of the machine.
Fig. 4 is a side view of one of the pantograph arms.
Figs. 5 and 6 are respectively an edge view and a plan of the other pantograph arm.
Fig. 28 shows details relating to a link connection.
Fig. 29 is a detail view of a bearing bracket.
Figures 11, 12:
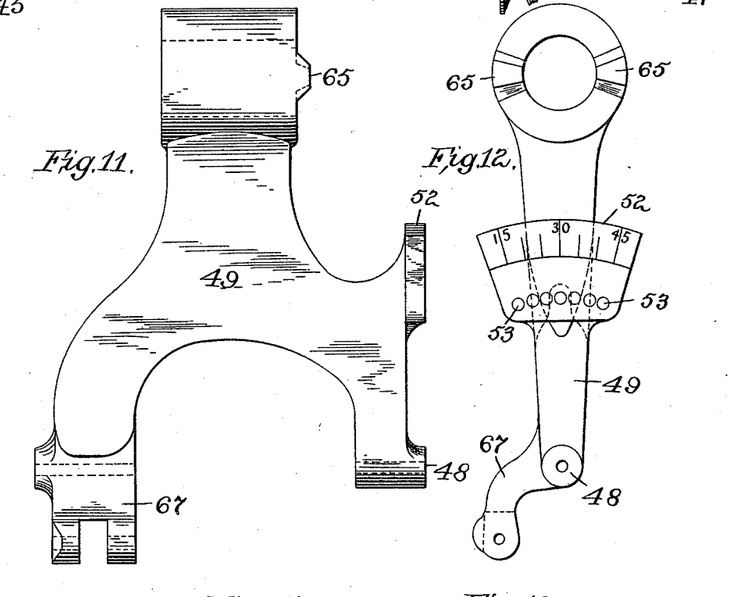
Fig. 11 is a side view of the grinder bracket or swinging arm.
Fig. 12 is a face view of the same.
Figures 13, 14:
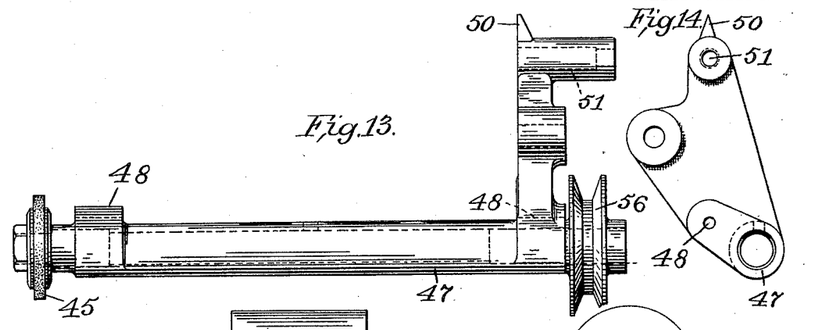
Fig. 13 is a side view of the grinder bearing.
Fig. 14 is a face view of the parts shown in Fig. 13.

The pantograph construction includes an arm 26 carrying the stylus at 27, which is moved by the operator over the pattern or form to be reproduced, which is supported in any suitable manner upon the platform 28 of the main bed 1. The stylus may be moved by the operator grasping the knob or finger piece 29. The arm 26 has pivotally connected thereto the pantograph arm 30, which, at its inner end, is provided with an opening 31 receiving a block 32 which is pivoted to a portion of the standard 9 by means of the pointed screws 33. A second pantograph arm 34 is pivotally connected to the stylus carrying arm 26 at a point intermediate of the point of connection of the arm 30 with the stylus arm 26, and this latter pantograph arm 34 has a head or end which is enlarged and has an opening therein to receive the central portion of the lower ball 6, Figs. 1 and 7 the said opening for this purpose having its walls curved to fit the periphery of the ball. Its enlarged end is split at 35, Figs. 5 and 6 and this split portion may be adjusted by a screw at 36 to adjust the bearing of the arm about the surface of the ball. This end of the arm lies between a socket bearing 37 having a socket 38 to receive the upper part of the ball, and an opening at 39 through which the spindle passes, and the socket cap plate 40, Figs. 8 and 9, the lower portion of the ball finding a bearing in the socket cap plate 40, which is secured by screws passing through studs 41 in the openings in the socket bearing 37, this cap plate lying on the under side of the end of the pantograph arm 34, with clearance provided for enlarged collar portion of spindle 22 while the socket bearing 37 overlies the said arm. The socket bearing is pivotally mounted to the pantograph arm 30 by upper and lower screws at 42, 43. The arm 34 is provided with an opening at 44 for the passage of the connecting stud between the socket bearing 37 and the socket cap 40.

It will be seen from the above description that upward and downward movement of the stylus will communicate to the cutting tool a like movement because of the vertical movement of the pantograph arm 30 about the pivot points 33 which support the block 32, it being observed that the pantograph arm 34 follows the up and down movement of the arm 30 about the pivots 33, and thus the spindle carrying the cutter is raised or lowered. Further, it will be seen that lateral movement of the stylus will be communicated through the arms 26 and 34 to the spindle and tool because of the pivoting of the socket bearing piece carrying these parts about the vertical axis 42. In these different movements of the pantograph arms, the spindle and tool will be kept in continuous rotation through the friction driving members 10 and 11, it being observed that the spherical driving face of the friction wheel 10 is struck on a curve the center of which is the center of the ball 7.

Figures 1, 7, 8, 9, 10, 26, 27:
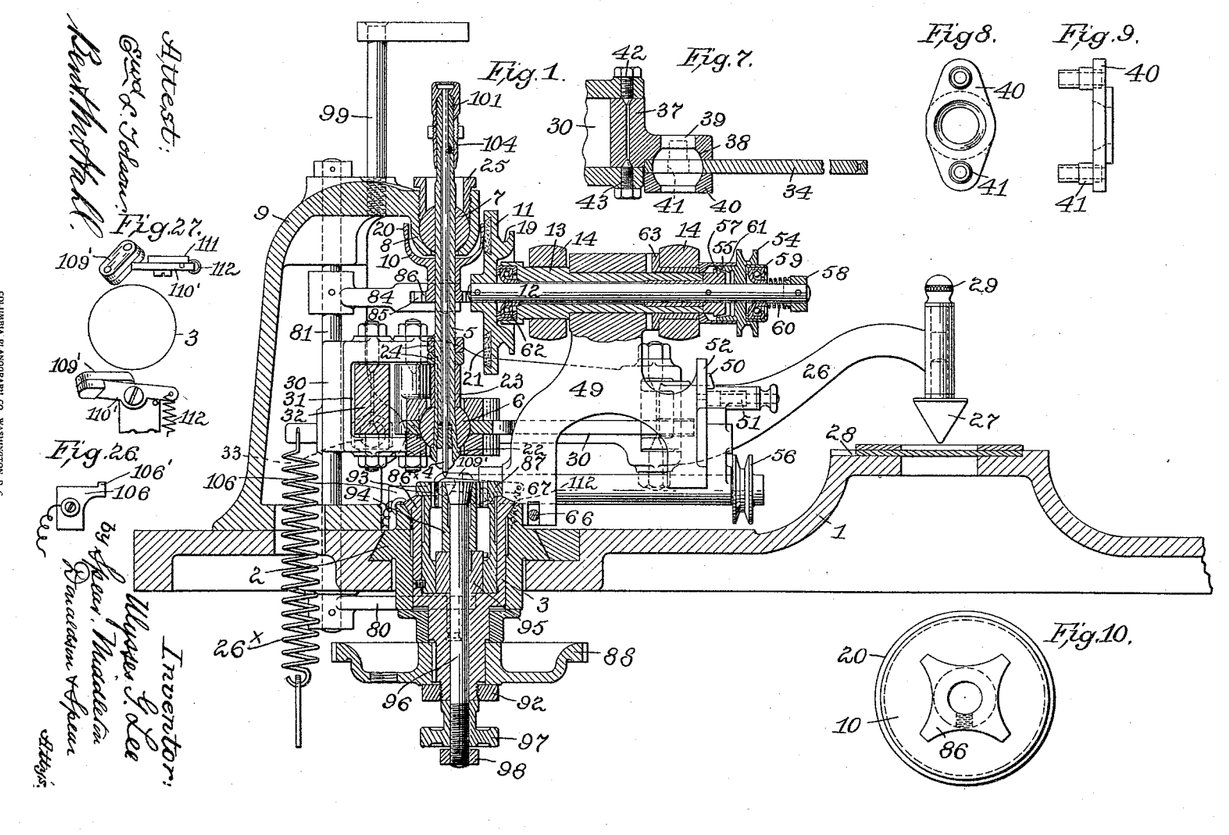
Figure 1 is a vertical sectional view through the apparatus with some parts omitted.
Fig. 7 is a sectional view of this pantograph arm in connection with the socket bearing and a portion of the spindle.
Figs. 8 and 9 are views respectively in plan and side elevation of the socket cap for connecting the pantograph arm with the spindle and ball bearing thereof.
Fig. 10 is a bottom plan view of the friction drive wheel on the spindle.
Fig. 26 is a detail view of a contact plate for indicating when the cutter is properly adjusted.
Fig. 27 shows in two views an oil stone.

*Grinding mechanism.*—A grinding wheel for the cutter is indicated at 45 on a shaft 46 carried in a grinder bearing 47 which is pivotally mounted at 48 to a grinder bracket 49 which, in turn, is pivotally hung upon the sleeve 13, and between the bearings 14 of the frame bracket, as shown in Fig. 1. This grinder bearing may be adjusted in relation to the grinder bracket, for which purpose it is provided with a pointer at 50 and a detent at 51, Figs. 1 and 3, the pointer moving over a suitable scale 52 on the grinder bracket, and the detent engaging any one of a series of holes 53 formed in the grinder bracket, this adjustment being for the purpose of securing the desired angle of cut or grinding as will be hereinafter made clear. Normally, when the engraving is being done, the grinder wheel 45 is out of service and stands away from the cutting tool, but when the engraving or cutting has been accomplished and the slide or carriage 2 has been moved in its slideway to withdraw the turret, together with the work piece or die stock held thereby from under the cutter, the grinding wheel, by this action, is automatically advanced to bring it against the cuttter for grinding the same. The grinding wheel is driven from the shaft 12 through the pulley 54 having a friction clutch connection with said shaft at 55, which friction clutch is out of service when the engraving or cutting is being done, so that then the pulley 54 will be at rest; but when, as above stated, the engraving or cutting has been accomplished and the die stock moved from under the cutter, the members of the friction clutch will be thrown into engagement to turn the pulley 54, and motion will be communicated from this pulley through a suitable belt to a pulley 56 on the shaft 46 on the grinding wheel, from which it will be seen that when the engraving or cutting is being done, the grinding wheel will not be rotated, but after the engraving has been effected, the grinding wheel is set in rotation, and is advanced to the cutter to sharpen the same, as will be presently described.

The friction clutch 55 comprises a hollow conical member on the pulley 54, and a conical member 57 pinned to the shaft 12. On the outer end of this shaft a collar 58 is pinned, and between this collar and a ball bearing 59 a spring 60 is arranged which serves to hold the pulley 54 against the pulley sleeve 61 surrounding the shaft 27 and the friction members. This sleeve 61 is interposed between the bearing 14 and the pulley.

Figures 15, 16:
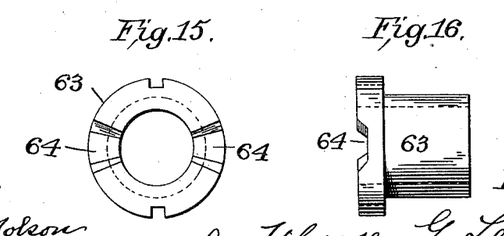
Fig. 15 is a face view of the cam collar or bearing.
Fig. 16 is a side view of the same.
Figure 17:
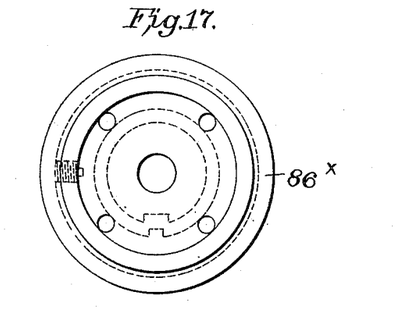
Fig. 17 is a plan view of the turret.
Figures 18, 20, 21, 22, 23, 23A:
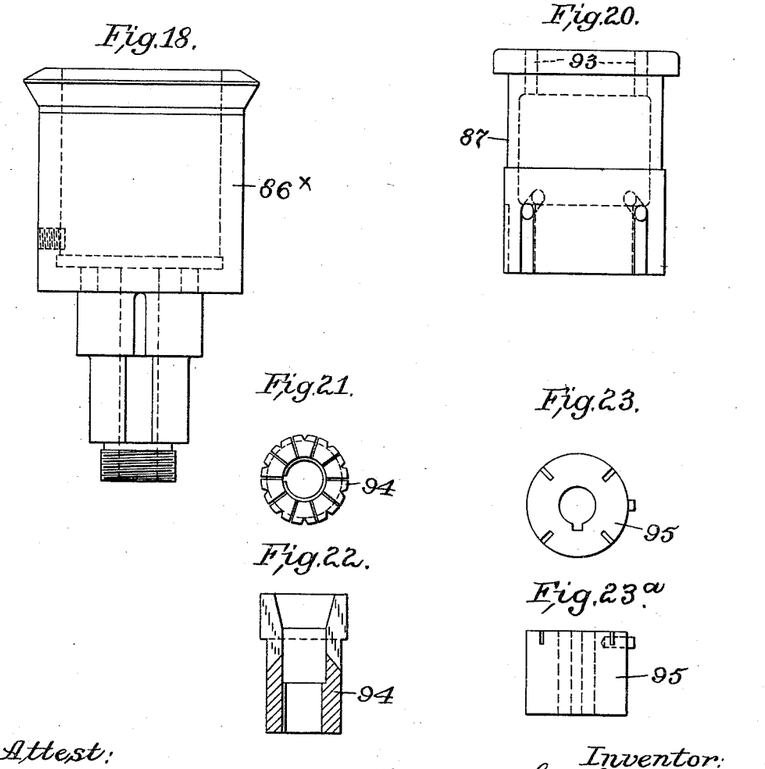
Fig. 18 is a side elevation of the turret.
Fig. 20 is a side elevation of the outer chuck member.
Fig. 21 is a plan view of the inner chuck member.
Fig. 22 is a sectional view of the inner chuck member.
Fig. 23 is a plan view of the die support.
Figure 19:
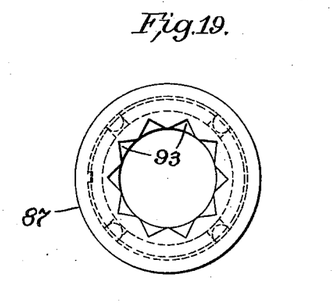
Fig. 19 is a plan view of the outer chuck member.

At the inner end of the sleeve 13 and interposed between it and the friction drive wheel 11, there is a ball bearing 62. Clamped within one of the bearings 14 by means of the cap screwed thereon is a collar or adjustable bearing 63 shown in detail, Figs. 15 and 16, which collar has at diametrically opposite points recesses 64 with inclined walls adapted to receive inclined projections 65 arranged diametrically in relation to each other on the end face of the grinder bracket 49, the engagement of the said projections with the said recesses of the bearing 63 being dependent upon the position circumferentially of the grinder bracket 49 in relation to the shaft 12 and bearing 63. The lower end of this grinder bracket has a link or I-bolt 66 connected with its depending arm 67, the other end of this I-bolt being threaded and engaged by a nut 68 having a kerf at its end to receive a screw driver blade for its adjustment, the said nut bearing in a bracket 69 secured to the slide or carrier 2 of the turret. From this construction it will be seen that when the carriage is moved in the direction of the arrow, Fig. 3, to withdraw the turret and the work piece from under the cutter, the cams or projections on the hub of the grinder bracket 49, together with the sleeve 13, will rotate in the bearings 14, and when the said cams or projections 65 come opposite the recesses in the bearing or collar 63, the spring 60 will exert its force and move the shaft 12 toward the right in Fig. 1, together with the sleeve 13, and cause the two friction clutch surfaces to engage and impart movement to the pulley 54, and thus to the grinding wheel through the connections above described, consisting of the pulley 56 and the shaft 46 of said grinding wheel. At the same time because the friction drive wheel 11 is pinned to the shaft 12, this wheel will be drawn out of engagement with the friction wheel 10 of the cutter spindle, so that said spindle and the cutter will no longer be driven. In the swinging movement of the grinder bracket 49, the grinder bearing is also moved because it is carried by the said grinder bracket which swings around the axis of the shaft 12, so that, as the work piece is withdrawn from under the cutter by the movement of the carriage 2, the grinding wheel will be swung forward, it now being in rotation, to bring it against the cutter for sharpening the same.

A spring 70 is interposed between the arm 67 of the grinder bracket and the bearing bracket 69 of the carriage, said spring surrounding the I-bolt 66 so that there will be no lost motion at the said I-bolt. It will be also understood that as the carrier 2, together with the work piece, is advanced to bring the work piece under the cutter, the operations above described in respect to the grinder will be reversed, namely: the grinder will be stopped from rotating because the cam surfaces between the hub of the grinder bracket 49 and the bearing 63 will move the shaft 12, together with the sleeve 13, toward the left, thus releasing the friction clutch members 57 and 55 from engagement, stopping the pulley 54 and the grinder, and this swinging movement of the grinder bracket 49 will carry the grinder in advance of the carriage and remove it from contact with the cutter, and furthermore, the leftward movement of the shaft 12 will carry the driving friction wheel 11 into contact with the friction drive wheel 10 of the cutter spindle to set the same in rotation for performing the cutting action. In the action just described resulting from the movement of the carrier 2 in the opposite direction from the arrow, Fig. 3, the motion of said carriage will be imparted to the grinder bracket through the bracket 69 and the spring 70.

Reverting to the adjustment of the grinder bearing about its pivotal point 48 where it connects with the grinder bracket as the said pivot is set directly in line axially with the point of the cutter, the angle at which the tool will be ground can be changed by swinging the grinder bearing about this point 48.

The carrier or work holder 2 for the turret is moved by a hand lever 71 connected with a disk 72 journaled in the bed plate and arranged below the same, said disk having a pin 73 eccentrically positioned thereon, which is connected by a link 74 with a stud or pin 75 extending down from the carrier or slide 2. The disk 72 has three notches in its periphery at 76 to be engaged by a roller 77 on a centering lever 78 pivoted on the under side of the bed plate and pressed by a spring 79. By turning this lever the carrier 2 may be advanced or withdrawn in relation to the cutter, and the three notches are for the purpose of locating the carrier in three different positions, one for the cutting, the other for the grinding, and the intermediate position at which the cutter is allowed to stop its rotation before being ground. In order to square up or adjust the cutter in proper circumferential position for grinding, an arm 80 is provided beneath the table or bed mounted on a vertical shaft 81, the upper end of which bears in the bracket or standard 9. This arm is connected by a spring 82 to a pin 83 extending down from the under side of the carrier. Near its upper end the shaft 81 has pinned thereto an arm 84 carrying a roller 85 to engage a star wheel 130 or notched portion 86 on the hub of the friction wheel 10. The arm 80 will therefore follow the movement of the carrier 2, and when this is moved in the direction of the arrow in Fig. 3 to its farthest position, the roller 85 will be brought into engagement with the notched or star wheel portion of the driving wheel 10, and thus the spindle and the tool will be centered or brought in proper register in relation to the grinding wheel.

The turret for holding the die stock or work piece comprises an outer steel cup-shaped bearing piece 86 which is securely held in the carriage 2. Within this cup-shaped bearing is the outer portion of the chuck 87 which is also of cup shape, and which is keyed to the part 86×. On the lower end of the outer member 86× and keyed thereto is a gear 88 which meshes with a pinion 89 on a shaft 90 journaled in the carrier, and it may be turned by a hand lever 91, so that the turret may be turned into any desired position, where it may be set in said position. A nut 92 is intended to take up wear in the turret. On the inner side of the chuck member 87 are grooves, as shown at 93, and within this member an inner chuck part or collar 94 is arranged. Resting on the shoulder portion of the turret 86× is the die support 95. This is keyed to a bolt 96 having at its upper end a flared portion which engages the upper split portion of the inner chuck member 94, the lower end of said bolt being threaded and engaged by a nut 97 by which it may be drawn down so that its conical upper head may act upon the inner chuck member 94 to spread the same, and thus clamp the die stock or work piece between the notched exterior of this inner chuck member and the notched interior of the outer chuck member 87. It will be seen that the die support 95 is provided with notches or slots cut longitudinally at its upper portion, the purpose of which is that after the work pieces have been placed in the turret and before the inner chuck member has been tightened by means of the nut 97, and the bolt 96, the operator can take hold of the collar 98 on the lower end of the bolt, and turn the same, together with the die support, and thus clean off any dirt that might be on the under side of the stock. After this has been done, the die stock or stocks are rigidly locked between the inner and outer members of the chuck by tightening the nut or finger wheel 97.

99 indicates a standard for holding an oil cup from which oil may be delivered into the center of the spindle, thus furnishing oil for the spindle bearings and the cutter.

Figures 2, 24, 25:
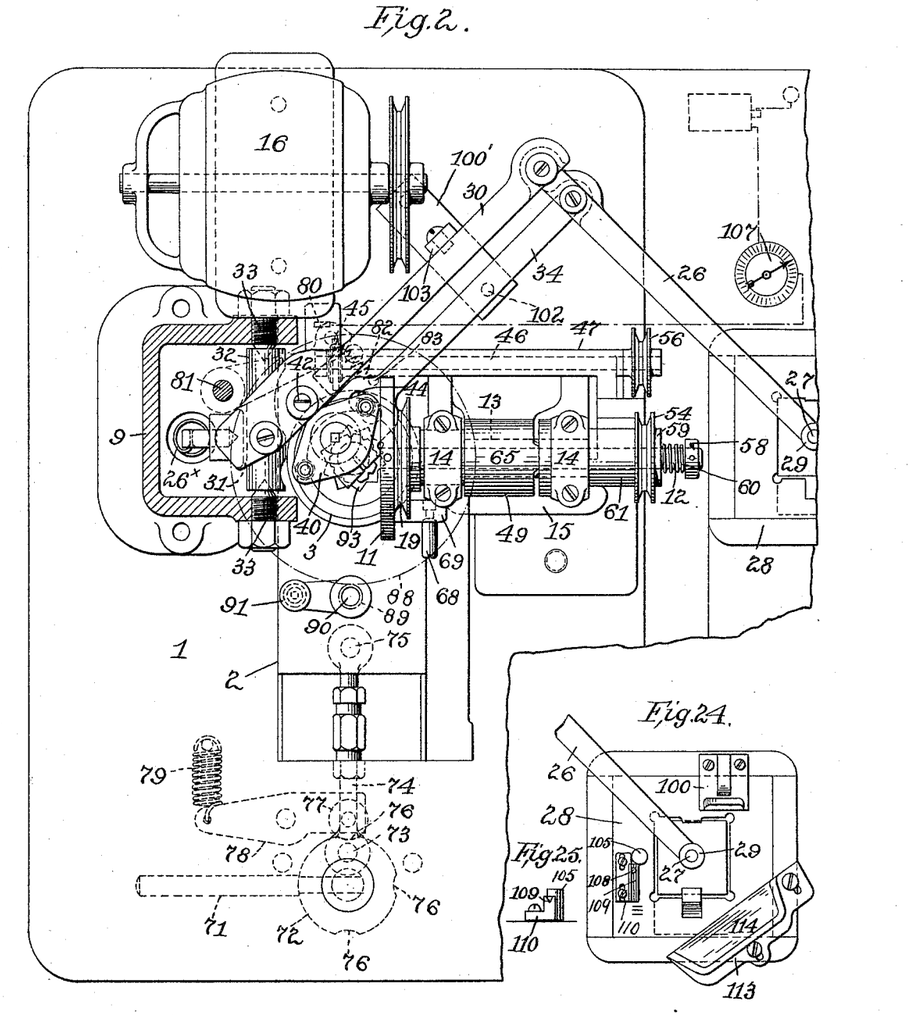
Fig. 2 is a plan view of an apparatus embodying the invention.
Fig. 24 is a view of the platform with several gages connected therewith.
Fig. 25 is a detail view of one of the gages shown in Fig. 24.

At 100, Fig. 24, is shown the grinding gage. There may be two of these gages, the upper one for the roughing cut and the lower one for the finishing cut. The cutter has a V-shaped key way at the upper end of its shank, as shown at 101, and a pointed set screw in the upper end of the spindle engages this key way and holds the tool always in the same position rotatively so that the tool will always present the same surface to the grinder.

Reverting to the ball bearings at the ends of the shaft 12, these are principally used as thrust bearings, one for the purpose of taking the pressure of the friction drive, while the other takes the pressure of the spring, but is only in action when the grinding mechanism is stationary, for at this time the shaft 12 is still in motion, while the pulley 54 is disengaged and remains stationary. The cam bearing or collar 63 is adjustable rotatably in the bearing 14, so that its cam face may be brought into proper relation to the cam on the hub of the swinging arm or grinder bracket 49. It is also adjustable through the frame bearing 14 so as to bring a greater or less degree of pressure of the friction wheel 11 against the friction wheel 10 of the spindle. When properly located, it is gripped by screwing down the cap of the bearing 14.

I may employ a gage to get the roughing cut for the depth of die plate, this consisting of a block 100′ fixed by a dowel pin 102 on the main bed plate and adapted to be borne upon by a gage post or arm 103 mounted on the pantograph arm 30, and adjustable vertically in respect thereto. This will limit the downward movement of the pantograph mechanism and of the cutter, and, consequently, the depth of cut.

The cutter is adjustable vertically in its spindle 5 by a micrometer arrangement shown generally at 104, and in order to determine when the cutter has been adjusted to the proper point vertically, a contact 105, Fig. 24, is mounted on the platform 28, and a contact plate 106, Fig. 26, is suitably mounted on the slide 2 of the machine in rear of the turret, so that by placing the stylus on top of the contact 105 the point of the cutter, if properly positioned or adjusted vertically, will engage the contact plate 106, and thus an electric circuit will be closed, causing the pointer 107, Fig. 2, to be moved to indicate the closing of the circuit, thus showing that the exact vertical adjustment of the cutter has been attained.

Adjacent the contact 105 there is another contact pin 108 located in a V-shaped groove 109 of a stand 110, Figs. 24 and 25. In using this contact, the pointed end of the stylus is placed in the V-shaped groove, and moved until its side strikes the side of the pin 108, when, if the lateral face of the cutter is properly ground and positioned, it will contact with the side of the contact point 106′ of the plate 106, and the electric circuit will be closed to deflect the needle 107, and thus indicate that this particular adjustment of the cutter has been attained.

I also provide an oil stone 109' carried by an arm 110' pivoted on a standard 111, Fig. 27, adjacent the turret, the oil stone 109 being held upwardly and against stop pin by a tension spring 112 at opposite end of lever 110. The oil stone is inclined, and is in position to be engaged by the point of the cutter, which, by moving the pantograph arms, can be made to pass back and forth over the oil stone for finishing its sharpening, and in order to gage this action, I provide a gage at 113 mounted on the platform 28 and having a downwardly inclined surface 114 parallel with the inclined surface of the oil stone, so that, by rubbing the point of the stylus back and forth over this gage 114, the point of the cutter will be given a similar movement over the oil stone, and thus sharpened. A counter balance for the pantograph mechanism is shown at 26× in Fig. 1.

What is claimed is:—

1. In an engraving machine, a cutter, a cutter spindle, a pair of ball bearings for pivotally mounting the cutter spindle, one ball bearing being at the upper end of the spindle and having a sliding connection therewith to permit the spindle to have vertical movement therethrough, the lower ball bearing being fixed on the spindle and a pantograph arm connected to the lower bearing to turn about the same, said pantograph arm being pivotally mounted to have universal movement, substantially as described.

2. In combination in an engraving machine, a cutter, a universal joint at the upper portion of the cutter for supporting the same, and a pantograph connected by a universal joint with the lower portion of the cutter and having vertical and horizontal pivotal movement, substantially as described.

3. In combination in an engraving machine, a cutter, a depending sleeve carrying the cutter, said cutter being adjustable vertically through said sleeve, means for rotating the sleeve, a pivotal support for the sleeve from which the sleeve depends, and a pantograph having a universal joint connection with the sleeve at its lower portion, substantially as described.

4. In combination in an engraving machine, a cutter pivoted at a point above its work end, a pantograph arm pivotally mounted at one end to swing vertically and horizontally, a stylus connected with the other end, and a universal joint connection between the said arm and the cutter at a point intermediate the pivoted end of said arm and the stylus carrying end, and a second arm parallel with the first arm and connected with the universal joint, substantially as described.

5. In combination in an engraving machine, a cutter, a pantograph arm having vertical and horizontal pivotal movement, a second pantograph arm pivotally connected to the first arm to have movement about an axis at right angles to the horizontal pivotal mounting of the first arm, a universal joint connection between the second arm and the cutter, and a stylus, substantially as described.

6. In combination in an engraving machine, a cutter, a pantograph arm pivotally mounted to have vertical and horizontal movement, a second pantograph arm pivotally connected to the first arm about a vertical axis, a universal joint connection between the second arm and the cutter, an arm carrying the stylus, and a pivotal connection between said arm and each of the pantograph arms, substantially as described.

7. In combination a cutter, a pantograph arm pivotally mounted to have vertical and horizontal movement, a second arm, a block pivoted about a vertical axis on the pantograph arm, a ball bearing carried by the block and furnishing a controlling connection for the cutter, said second pantograph arm engaging the ball bearing, and a stylus carrying arm connected with the pantograph arms, substantially as described.

8. In combination in an engraving machine, a cutter, a ball bearing for supporting the same, a drive wheel connected with the cutter and surrounding the ball bearing, and means for driving said wheel, substantially as described.

9. In combination in an engraving machine, a cutter, a ball bearing for supporting the same, a drive wheel connected with the cutter and surrounding the ball bearing, and means for driving said wheel, said wheel having a spherical contact surface for the said driving means, substantially as described.

10. In combination a cutter, a universal joint support for the upper part of the cutter, a pantograph arm having an opening therethrough, a block extending through said opening and mounted on horizontal pivots, a vertical pivotal connection between the block and the pantograph arm, a second pantograph arm, a block pivoted thereto about a vertical axis, a ball bearing mounted in the block and connected with the lower end of the cutter, and a stylus carrying arm connected with the pantograph arms, substantially as described.

11. In combination in an engraving machine, a cutter, a universal joint for the upper portion thereof, a pantograph arm having a pivot support permitting it to move vertically or laterally, a universal joint support for the lower portion of the cutter, a block carrying said support and pivoted about a vertical axis on the pantograph arm, a second arm connected with the said universal joint support, a stylus, and an arm carrying the same pivotally connected to the pantograph arms, and for throwing the same into action when the work holder is moved to the cutter, substantially as described.

12. In combination in an engraving machine, a vertical cutter, driving means therefor, a work holder movable to and from position under the cutter to remove and replace the work piece and means for automatically throwing the driving means of the cutter out of operation when the work holder is moved away from the cutter and for throwing the same into action when the work holder is moved to the cutter, substantially as described.

13. In combination in an engraving machine, a cutter, a friction drive wheel for the cutter, a second friction drive wheel to contact with the one first mentioned, means for driving the second friction drive wheel, a movable holder for the work piece, and a connection between the said movable holder for shifting the second drive wheel out of connection with the first drive wheel when the holder is moved away from the cutter, substantially as described.

14. In combination in an engraving machine, a rotary cutter, a work holder and a grinder, said holder being movable to and from position in relation to the cutter, and means for automatically advancing the grinder to sharpen the cutter when the holder is moved away from the cutter, substantially as described.

15. In combination in an engraving machine, a rotary cutter, a holder movable to and from position in relation to the cutter, a grinder, with means for advancing the same to the cutter when the holder is moved away therefrom, for sharpening the tool, and means for automatically centering or squaring the cutter for the grinding operation, substantially as described.

16. In combination in an engraving machine, a cutter, driving means therefor, a holder for the work piece movable to and from position in relation to the cutter, a grinder with connections to the holder for advancing the grinder to the cutter when the holder is moved away therefrom, and means for automatically throwing the driving means of the cutter out of operation when the grinder is advanced to do the cutting, substantially as described.

17. In combination in an engraving machine, a cutter, driving means therefor, a holder for the work piece movable to and from position in relation to the cutter, a grinder with connections to the holder for advancing the grinder to the cutter when the holder is moved away therefrom, means for automatically throwing the driving means of the cutter out of operation when the grinder is advanced to do the cutting, and means for centering or squaring the cutter for the grinding action, substantially as described.

18. In an engraving machine, in combination with the cutter, a holder for the work piece movable toward and from the cutter, and a grinder movable toward and from the cutter for sharpening the cutter while its position is maintained in the machine, substantially as described.

19. In combination a cutter, driving means therefor, a work holder, a grinder with driving means therefor, means for throwing the driving means of the cutter out of operation and simultaneously throwing the driving means of the grinder into operation, substantially as described.

20. In combination in an engraving machine, a cutter, a work holder movable toward and from the cutter, a grinder with connections for advancing it to the cutter when the work holder is moved therefrom, and for retracting the grinder when the holder is advanced to proper relation with the cutter, driving means for the cutter, and driving means for the grinder, with means for throwing the driving means of the grinder into operation, substantially as described.

21. In combination a cutter, a sliding carrier, a work holder carried thereby, a shaft 12, a driving pulley on the said shaft, a driving wheel connected with the cutter and driven from said pulley, a grinder, a driving pulley therefor, a clutch between the said pulley and the shaft 12, a swinging grinder bracket turning about the shaft 12, cam means associated with the said bracket for giving a longitudinal movement to the shaft to withdraw the driving pulley from the driving wheel of the cutter, and to throw the clutch into operation for starting the grinder, and a connection between the grinder bracket and the carrier or slide of the work holder, substantially as described.

22. In combination a cutter, a movable work holder, a grinder, a driving connection for the cutter, a driving connection for the grinder, a movable support for the grinder connected with the movable work holder to advance the grinder to the cutter when the work holder is withdrawn therefrom, and cam means associated with the movable support of the grinder for throwing the driving connection of the cutter out of operation and the driving connection of the grinder into operation from the movement of the work holder, substantially as described.

23. In combination a cutter, a work holder, a grinder, a movable support for the grinder connected with the work holder to advance the grinder to the cutter when the work holder is withdrawn therefrom, and an adjustable connection between the grinder and its support whereby the cutter may be set to cut at the desired angle, substantially as described.

24. In combination a cutter, a movable work holder, a driving shaft 12 with connections to the cutter, a grinder, a driving connection from the shaft 12 to the grinder including a clutch, a swinging bracket turning about the shaft 12 and connected with the movable work holder, and a grinder bearing adjustably mounted on the swinging bracket, said swinging bracket having cam means for controlling the driving connections of the cutter and the grinder, substantially as described.

25. In combination a cutter, a movable work holder, a grinder, driving connections for the cutter, and centering means for the cutter connected with the movable work holder, substantially as described.

26. In combination a cutter, a movable work holder, driving connections for the cutter controlled from the work holder to be thrown out of operation when said work holder is moved away from the cutter, a grinder, and centering or squaring up means for the cutter connected with the movable work holder to be thrown into action when the work holder is moved away from the cutter, substantially as described.

27. In combination a cutter, a movable work holder, driving connections for the cutter controlled from the work holder to be thrown out of operation when said work holder is moved away from the cutter, a grinder, and centering or squaring up means for the cutter connected with the movable work holder to be thrown into action when the work holder is moved away from the cutter, said squaring up means consisting of the notched or star wheel connected with the cutter, and a detent connected with the work holder, substantially as described.

28. In combination with a cutter, a turret for holding the work comprising an outer member with means for turning the same, a chuck member within the outer member having notches on its interior, an inner chuck member arranged centrally of the first chuck member, and a bolt for clamping and spreading the inner chuck member, substantially as described.

29. In combination with a cutter, a turret for holding the work comprising an outer member with means for turning the same, a chuck member within the outer member having notches on its interior, an inner chuck member arranged centrally of the first chuck member, a bolt for clamping and spreading the inner chuck member, and means for rotating the turret to different positions, substantially as described.

30. In combination a cutter, a work holder comprising the chuck members, a die support at the lower part of the chuck members, and means for turning the die support to clean off the die stock, substantially as described.

31. In combination a cutter, a work holder comprising the chuck members, a die support at the lower part of the chuck members, and means for turning the die support to clean off the die stock, said means consisting of the central bolt which also serves to clamp the inner chuck member in place, substantially as described.

32. In combination a cutter, a movable carrier, a work holder carried thereby, a grinder, means for advancing the grinder when the carrier is retracted from the cutter, means for moving the carrier, and detent means to determine three positions of said carrier, one for cutting, one for grinding, and one for allowing the cutter to cease its rotation, substantially as described.

33. In combination in apparatus of the class described, a cutter, pantograph arms connected therewith, a stylus, a contact for the stylus, and a contact for the cutter, with means for adjusting the cutter, and means for indicating when the stylus and cutter are in engagement with their respective contacts.

34. In combination in a machine of the class described, a cutter, pantograph arms and a stylus for operating the cutter, means for adjusting the cutter, and means operating in connection with the stylus for indicating when the cutter is adjusted to the proper depth, substantially as described.

35. In combination with the cutter and the pantograph arms, a lateral contact to be engaged by the cutter, a lateral contact to be engaged by the stylus, and indicating means to show when the contacts are in engagement, substantially as described.

36. In combination a cutter, pantograph arms for adjusting the cutter, a stylus, an oil stone for the cutter, and a gage for the stylus to control the movement of the cutter over the oil stone, substantially as described.

37. In combination a cutter, pantograph arms, a stylus, a yieldingly mounted oil stone arranged in inclined position, and an inclined gage for the stylus, substantially as described.

38. In combination with the cutter, pantograph arms, and a gage for regulating the depth of cut consisting of a member adjustably mounted on one of the pantograph arms, and a contact surface on the bed of the machine, substantially as described.

39. In combination in an engraving machine, a cutter, a sliding work carriage, a turret for holding the work, said turret having rotary movement in the carriage, and inner and outer chuck members notched at their adjacent faces for holding the work pieces between them, said chuck members being carried by the turret, substantially as described.

40. In combination in an engraving machine, a cutter, a sliding work carriage, a turret for holding the work, said turret having rotary movement in the carriage, a stylus, a pattern or form, a pantograph arm connected with the cutter and means for turning the turret irrespective of the pattern whereby the cutting of the same letter may be repeated from one copy as desired, substantially as described.

41. In combination in an engraving machine, a cutter, a carrier for the work, an indicating contact to show the proper condition of the cutter, said contact being moved into effective position at the same time the work is moved away from the cutter, substantially as described.

42. In combination, a cutter, a grinder, a work carrier movable to and from the cutter, a contact to indicate the proper condition of the cutter driving means for the cutter and grinder and means for disconnecting the power from the cutter and transferring the same to the grinder when the work is moved away from the cutter, the said cutter being brought into engagement with the contact when the work carrier is moved away therefrom, substantially as described.

In testimony whereof, I affix my signature in presence of two witnesses.

ULYSSES G. LEE.

Witnesses:
G. C. FIEGEL,
L. FRANKLIN.

---

Copies of this patent may be obtained for five cents each, by addressing the "Commissioner of Patents, Washington, D. C."